2,733,228
BLENDS OF VINYL CHLORIDE POLYMERS WITH ETHYLENE/VINYLENE CARBONATE COPOLYMERS

Ival O. Salyer and James A. Herbig, Dayton, Ohio, assignors to Monsanto Chemical Company, St. Louis, Mo., a corporation of Delaware No Drawing. Application December 11, 1953, Serial No. 397,791

9 Claims. (Cl. 260—45.5)

This invention relates to improved vinyl chloride polymer materials. In one aspect the invention pertains to polyvinyl chloride of improved processability.

Vinyl chloride polymers, especially homopolymers of vinyl chloride and copolymers of vinyl chloride with not more than 5 to 10 weight per cent of other copolymerizable monomers, constitute one of the most important classes of vinyl resins. Because of their inertness, non-flammability, and in general good physical properties, vinyl chloride polymers find many uses. Rigid polyvinyl chloride articles, such as sheets, tubes, rods, and the like can be made, or by addition of considerable quantity of plasticizer polyvinyl chloride is made flexible and rubbery permitting the production of garden hose, film, and the like.

Unplasticized polyvinyl chloride has very poor processing characteristics. When milled on rolls, the sheet is not maintained but rather is subject to severe tearing. It is very difficult to injection mold polyvinyl choride successfully because of its flow characteristics and the fact that molding temperatures are necessarily so high as to cause significant decomposition of the polymer. It would be desirable to provide polyvinyl chloride of improved flowability and processing characteristics without a concomitant severe decrease in heat distortion temperature, thus permitting the production of rigid polyvinyl chloride products with greater facility.

In accordance with the present invention, blends are provided of vinyl chloride polymers with ethylene/vinylene carbonate copolymers. Copolymers of ethylene with vinylene carbonate are new materials, and are described in detail in the copending application of Earl W. Gluesenkamp and John D. Calfee, Serial No. 355,859, filed May 18, 1953, the contents of which application are incorporated herein by reference. A blend of polyvinyl chloride with an ethylene/vinylene carbonate copolymer is much more processable than the polyvinyl chloride alone, yet the softening point or heat distortion point of the blend is not nearly so low as a blend of the polyvinyl chloride with the same amount of the usual low molecular weight liquid plasticizers. While polyethylene is hardly at all compatible with polyvinyl chloride, ethylene/vinylene carbonate copolymer, although resembling polyethylene in many ways, is much more compatible with polyvinyl chloride.

The terms "polyvinyl chloride," "vinyl chloride polymer," and "polymer of vinyl chloride," as used herein are intended to include homopolymers of vinyl chloride, i. e., polymers prepared by subjecting to polymerization a monomeric material consisting of vinyl chloride as the sole polymerizable constituent, and copolymers of vinyl chloride with other ethylenically unsaturated monomers copolymerizable therewith. While the invention can be applied to copolymers with vinyl chloride containing a major proportion, i. e., over 50 weight per cent, vinyl chloride, it is most useful as applied to polymers of vinyl chloride prepared from monomers containing from 100 to 95 weight per cent vinyl chloride and 0 to 5 weight per cent of a comonomer. Inasmuch as the polymerization art is well-developed with respect to materials which are copolymerizable with vinyl chloride, it is not deemed necessary to provide here a long list of comonomers. Merely by way of example can be mentioned vinyl acetate, vinylidene chloride, acrylonitrile, methyl vinyl ether, methyl methacrylate, styrene. See U. S. Patent No. 2,624,724, column 6, lines 19–56, for other examples of suitable comonomers. Of course, polymers made from vinyl chloride and two or more comonomers are also applicable. In any event, the polymer employed should have a high molecular weight suitable for the use intended, i. e., suitable for a useful film, fiber, filament, or other structure.

The term "blend" is used herein in a broad sense to include both mechanical blends of preformed vinyl chloride polymers with preformed ethylene/vinylene carbonate copolymers, and blends prepared by polymerizing monomeric vinyl chloride in the presence of preformed ethylene/vinylene carbonate copolymers. Thus, preformed vinyl chloride polymer and preformed ethylene/vinylene carbonate copolymer can be brought together into intimate admixture by any suitable mechanical means, such as by milling on cold or heated mill rolls, mixing in a Banbury mixer, or mixing emulsions, suspensions, or dispersions of the two polymers and coagulating same. On the other hand, an ethylene/vinylene carbonate copolymer can be incorporated in monomeric vinyl chloride and the resulting material subjected to polymerization. For best results such polymerization should be carried to a high conversion, such as greater than 95 per cent conversion to high molecular weight vinyl chloride polymer. In preparing such a "polymerization blend," the ethylene/vinylene carbonate copolymer should be thoroughly and intimately dispersed in the monomeric material prior to polymerization. It is believed highly probable that in the practice of the embodiments of this invention involving polymerization of vinyl chloride in the presence of preformed ethylene-vinylene carbonate copolymers, a certain amount of interpolymerization occurs between vinyl chloride and ethylene/vinylene carbonate copolymer molecules, with the resultant formation of what can be called a graft polymer, although it is by no means certain and is even doubtful that all molecules of ethylene/vinylene carbonate copolymer become united with one or more vinyl chloride monomer units. However, the invention is not to be limited by any theory of particular reaction mechanism.

Homopolymer or copolymer of vinyl chloride, as described herein, can be any of the known vinyl chloride polymerization techniques from monomeric material comprising vinyl chloride, either with or without ethylene/vinylene carbonate copolymer present. One of the most common of said techniques is mass polymerization wherein the only material present in the reaction mixture is the monomer or monomers plus any catalyst and any modifier that may be used to affect the molecular weight, plus ethylene/vinylene carbonate copolymer if it is to be incorporated during the polymerization, and no added solvent or other reaction medium is present. Suitable catalysts are those that promote free radicals, e. g., peroxy and azo catalysts By way of example are benzoyl peroxide, diacetyl peroxide, dimethylphenylhydroperoxymethane, α,α'-azobis isobutyronitrile. Solvent polymerization is similar t mass polymerization, except that a solvent for th monomer and/or polymer is also present during the pol merization. Use of a solvent results in a lower molect lar weight polymer. The polymerization of vinyl chl ride, with or without comonomers, can also be effecte advantageously by suspension or emulsion technique Both of these techniques involve the use of a non-solve for the monomer and polymer, but in the suspensic technique the particles of monomer and ultimately of t polymer are comparatively large, while in the emulsi procedure the particles are quite small and the fir product is a stable latex. A suitable method for effecti the suspension polymerization of vinyl chloride is to employ water and a small amount of an added suspending agent, such as a vinyl acetate-maleic anhydride copolymer or certain phosphates, a lauroyl peroxide catalyst, and a limited amount of an emulsifier such as glyceryl monostearate. A suitable emulsion polymerization procedure is to employ water along with potassium persulfate catalyst, any suitable emulsifier, and no polymerization modifier. Emulsion and suspension polymerization can be effected at temperatures which are chosen in accordance with the catalyst system used but which may for example be from 40° C. to 60° C.

The materials blended with vinyl chloride polymers in the practice of the present invention are copolymers of ethylene with vinylene carbonate. Properties of vinylene carbonate and methods of preparing same are described by Newman and Addor, Jour. Amer. Chem. Soc., 75, 1263, March 5, 1953. Vinylene carbonate has the structural formula:

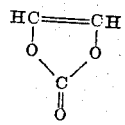

A suitable method of preparing vinyl carbonate is chlorination of ethylene carbonate to form monochloroethylene carbonate, followed by dehydrochlorination of the latter by reaction with an amine, resulting in vinylene carbonate.

The invention encompasses blends of vinyl chloride polymers with ethylene/vinylene carbonate copolymers containing ethylene and vinylene carbonate in all proportions. Most copolymers will contain from 5 weight per cent to 99 weight per cent ethylene and from 95 weight per cent to 1 weight per cent vinylene carbonate, based upon the combined weights of the monomers entering into the copolymer. In its broadest aspects the invention contemplates use of polymers of ethylene containing the smallest significant quantity of vinylene carbonate, which may be 1 weight per cent or less, and at the other extreme the use of polymers of vinylene carbonate containing the smallest significant quantity of ethylene, which may be 1 weight per cent or less, and all proportions between those extremes. However, of particular interest are ethylene/vinylene carbonate copolymers containing a major proportion by weight of ethylene and a minor proportion by weight of vinylene carbonate combined in the copolymeric material. Copolymer compositions within the range of ethylene/vinylene carbonate weight proportions of 99:1 to 70:30 are ordinarily most useful in the practice of the invention. It is often preferred to prepare copolymers by polymerization of monomeric material comprising ethylene and vinylene carbonate containing a sufficiently high proportion of ethylene to produce a polyethylene-like material, i. e., a high molecular weight normally solid polymer having the general properties of polyethylene per se, i. e., polyethylene prepared from monomeric material consisting of ethylene.

Any suitable combination of polymerization conditions resulting in the formation of a copolymer from a monomeric material comprising ethylene and vinylene carbonate can be employed. However, in preferred embodiments a monomeric material comprising ethylene and vinylene carbonate is subjected to copolymerization at high pressures, preferably at least 5000 pounds per square inch. Pressures of at least 15,000 pounds per square inch are more preferably employed, resulting in a product having high self-compatibility (homogeneity). Often optimum results are obtained at pressures within the range 20,000 to 40,000 pounds per square inch. There is no particular upper pressure limit except that imposed by equipment limitations and pressures up to 200,000 pounds per square inch and even higher are suitable. It will be understood that suitable precautions should be observed in effecting this polymerization process, including the use of rupture discs, barriers, and other well-known means for carrying out high pressure reactions with safety. It is possible to have a combination of reaction conditions resulting in an explosive reaction, and this should be guarded against by known means. However, technical facilities for the commercial use of high pressures have been adequately developed, and therefore the high pressures employed are no barriers to commercial use of the high pressure copolymerization process. The copolymerization is preferably carried out at temperatures within a fairly broad range, which is preferably 35° C. to 125° C. The preferred range is 50° C. to 100° C.

The invention in its broadest aspects is not departed from by blending vinyl chloride polymers with ethylene/vinylene carbonate copolymers made by providing, in addition to ethylene and vinylene carbonate, other monomeric materials capable of entering into the polymerization reaction. Thus, vinyl chloride, vinyl acetate, vinyl fluoride, propylene, styrene, acrylonitrile, and other unsaturated organic compounds can be used as co-monomers along with the ethylene and vinylene carbonate. This of course will affect the polymer properties but the amount can be chosen so as to retain the advantageous results of the copolymerization of vinylene carbonate with ethylene.

In copolymerizing ethylene with vinylene carbonate it is preferred to employ catalysts of the free-radical promoting type, principal among which are peroxide-type polymerization catalysts and azo-type polymerization catalysts, e. g., diacetyl peroxide, dimethylphenylhydroperoxymethane, diazoaminobenzene, in small but catalytic amounts usually within the range of 0.001 to 0.5 per cent by weight of the comonomers. The ethylene/vinylene carbonate copolymerization can be effected in the presence of catalytic amounts of oxygen, as within the range of 10 to 200 parts oxygen per million parts monomeric material on the weight basis. The copolymerization can also be effected under the influence of ionizing radiation of polymerizing intensity, such as gamma rays provided by cobalt-60 or other radioactive substances, using the general procedures described and claimed in the copending application of William H. Yanko and John D. Calfee, Serial No. 318,098, filed October 31, 1952. Copolymers of ethylene and vinylene carbonate employed in accordance with the present invention are inclusive of modified polymeric materials known as telomers, obtained by carrying out the copolymerization in the presence of materials which are non-polymerizable under the conditions employed but which combine with a plurality of units of the monomers, e. g., carbon tetrachloride, organic acids, esters, mercaptans, alcohols, etc. Additional details directed to the preparation of ethylene/vinylene carbonate copolymers, which can be used in the present invention, will be found in the above-mentioned copending application of Earl W. Gluesenkamp and John D. Calfee, Serial No. 355,859, filed May 18, 1953.

Vinylene carbonate units in the ethylene/vinylene carbonate copolymers are subject to hydrolysis, whereby part or all of said units are converted to units of the following type in the polymer:

The present invention includes blends of vinyl chloride polymers with ethylene/vinylene carbonate copolymers that have undergone hydrolysis, and even that subsequent to hydrolysis have been subjected to further treatment to react other materials with part or all of the hydroxy groups, e. g., with aldehydes to produce acetals.

Particularly useful compositions of the present invention are blends of from 99 to 70 parts by weight of vinyl chloride polymer with from 1 to 30 parts by weight of ethylene/vinylene carbonate copolymer, and often preferably from 95 to 85 parts vinyl chloride polymer with from 5 to 15 parts ethylene/vinylene carbonate copolymer. Such blends can also include, if desired, additional materials such as plasticizers, e. g., dioctyl phthalate, dioctyl adipate, tricresyl phosphate, dioctyl sebacate, thermal stabilizers, fillers, dyes, pigments, other polymers, and the like. Those skilled in the art, having had the benefit of the present disclosure, will be able to choose by simple tests suitable proportions of a particular vinyl chloride polymer and a particular ethylene/vinylene carbonate copolymer to give a blend having characteristics desired for a particular use.

While the compositions of the present invention find particular use in making rigid or semi-rigid polyvinyl chloride articles, sufficient plasticizer can be included to permit the production of flexible articles. Rigid sheets or structures can be compression molded, or usually with less advantage can be injection molded. Films, filaments, and the like can be cast or spun from solution by wet-spinning or dry-spinning procedures well known in the art.

The following examples provide details of certain preferred embodiments of the invention. The data are to be taken as exemplary, and the invention in its broadest aspects is not limited to the particular conditions, proportions, and materials set forth therein.

*Example 1*

A commercial polyvinyl chloride resin was subjected to testing as indicated below.

This polyvinyl chloride when subjected to conventional mill-rolling undergoes tearing and shredding to a severe degree.

The following physical properties are characteristic of this polyvinyl chloride, as determined on specimens compression-molded at 165° C.

| | |
|---|---|
| Tensile strength at failure, p. s. i. | 9650 |
| Tensile elongation at failure, percent | 4.5 |
| Flexural strength, p. s. i. | 14,400 |
| Flexural deflection, in. | 0.80 |
| Clash-Berg data: | |
| $T_f$ (° C.) | 73 |
| $T_{2000}$ (° C.) | 91 |
| Stifflex range (° C.) | 18 |

Ninety parts of polyvinyl chloride as described above was intimately blended with 10 parts of an ethylene-vinylene carbonate copolymer. Preparation of the ethylene-vinylene carbonate copolymer is described in detail in Example 2 below. On subjecting the blend of polyvinyl chloride with ethylene-vinylene carbonate copolymer to milling in the same manner to which the polyvinyl chloride alone had been subjected, it was found that the blend milled smoothly in a continuous sheet, with no tearing or shredding. Further, the improved flow characteristics of the blend make it more amenable to injection molding than the polyvinyl chloride alone. However, addition of some plasticizer is desirable in order to permit injection molding without sign of degradation.

The following physical properties were determined on compression-molded samples of the polyvinyl chloride-ethylene-vinylene carbonate blend.

| | |
|---|---|
| Tensile strength at failure, p. s. i. | 5450 |
| Tensile elongation at failure, percent | 6.7 |
| Flexural strength, p. s. i. | 13,460 |
| Flexural deflection, in. | 0.78 |
| Clash-Berg data: | |
| $T_f$ (° C.) | 70.5 |
| $T_{2000}$ (° C.) | 91.2 |
| Stifflex range (° C.) | 20.7 |

Addition of the ethylene-vinylene carbonate copolymer to the polyvinyl chloride appreciably lowered the tensile strength, slightly increased the tensile elongation, and did not greatly affect the flexural properties. However, use of the ethylene-vinylene carbonate copolymer in admixture with polyvinyl chloride permitted milling without difficulties, and very markedly improved the flow characteristics of the material. The decrease in the $T_f$ Clash-Berg value is actually within the limits of the measurement, and is to be contrasted with results obtained when using the same amount of low molecular weight plasticizer, which lowers the $T_f$ value by 3 or 4° C. for each 1 per cent added plasticizer. Thus, the blend of polyvinyl chloride with ethylene-vinylene carbonate copolymer can still be used to produce rigid polyvinyl chloride articles, such as sheets, rods, and the like.

A similar blend of 10 per cent polyethylene in polyvinyl chloride gives a cheesy product of extremely poor properties. The present blend of ethylene-vinylene carbonate copolymer with polyvinyl chloride is much more compatible. The blend is translucent, but is stressed beyond the yield point the area under stress turns white. Increased concentrations of the copolymer result in greater opacity.

Data given in the preceding tables were determined by the following test procedures:

Clash-Berg modulus characteristics:
    A. Brittle temperature ($T_f$), ° C.
    B. Rubber temperature ($T_{2000}$), ° C.
    C. Stifflex range ($T_{2000}-T_f$), ° C.

This test is a measure of the stiffness of a plastic specimen as a function of temperature, measured by Clash and Berg, Industrial and Engineering Chemistry, 34, 1218 (1942). The brittle temperature ($T_f$) is the temperature at which the stiffness modulus is 135,000 p. s. i. The rubber temperature ($T_{2000}$) is the temperature at which the stiffness' modulus is 2000 p. s. i.

Tensile properties:
    Strength to break, p. s. i.
    Elongation to break, percent.

These tests are determined by the standard tests ASTM D 638–46T, D 412–41.

Flexural properties:
    Strength, p. s. i.
    Deflection, in.

These tests are determined by the standard test method ASTM D 790–45 T.

*Example 2*

The ethylene-vinylene carbonate copolymer employed in the tests described above in Example 1, was prepared as follows:

A mixture of ethylene and vinylene carbonate monomers (5 to 1 weight ratio) was polymerized at 20,000 pounds per square inch with $\alpha,\alpha'$-azodiisobutyronitrile catalyst. The bomb was charged with the monomer mixture at −78° C. and while the mixture was still cold, it was pressured to 6000 pounds per square inch with water. As the temperature rose to about 80° C., the pressure reached a maximum of 22,000 pounds per square inch. Under these conditions rapid polymerization occurred (1.75 hours) and the pressure dropped to 12,000 pounds per square inch. The copolymer was formed in 25 per cent yield. It was found by direct oxygen analysis to contain 10.7 weight per cent vinylene carbonate units in the copolymer.

The ethylene-vinylene carbonate copolymer had the following properties:

| | |
|---|---|
| Tensile strength at failure, p. s. i. | 2229. |
| Tensile elongation at failure, % | 470. |
| Clash-Berg data: | |
| $T_f$ (° C.) | −24. |
| $T_{2000}$ (° C.) | 82. |
| Stifflex range (° C.) | 106. |
| Approximate molecular weight (by melt viscosity). | 19,000. |
| Appearance | Almost clear, (slightly hazy). |
| Density | 0.96. |

We claim:

1. A blend of a vinyl chloride polymer with an ethylene-vinylene carbonate copolymer.

2. A blend of a vinyl chloride homopolymer with an ethylene-vinylene carbonate copolymer.

3. A blend of a vinyl chloride polymer with a normally solid polyethylene-like ethylene-vinylene carbonate copolymer containing a major proportion by weight of ethylene and a minor proportion by weight of vinylene carbonate in said copolymer.

4. An intimate admixture of from 99 to 70 parts by weight of a vinyl chloride polymer with from 1 to 30 parts by weight of an ethylene-vinylene carbonate copolymer containing from 1 to 30 weight per cent vinylene carbonate in said copolymer.

5. A method of improving the hot processability of polyvinyl chloride which comprises intimately admixing therewith a lesser quantity by weight of an ethylene-vinylene carbonate copolymer comprising a major proportion by weight of ethylene and a minor proportion by weight of vinylene carbonate in said copolymer.

6. A normally rigid polyvinyl chloride structure containing from 95 to 85 parts by weight of polyvinyl chloride and from 5 to 15 parts by weight of a normally solid polyethylene-like ethylene-vinylene carbonate copolymer comprising from 70 to 99 weight per cent ethylene and from 30 to 1 weight percent vinylene carbonate in said copolymer.

7. A blend according to claim 1 wherein said vinyl chloride polymer is a copolymer of vinyl chloride with up to 5 weight per cent of an ethylenically unsaturated monomer copolymerizable therewith.

8. A blend according to claim 1 made by mechanically mixing preformed vinyl chloride polymer and preformed ethylene-vinylene carbonate copolymer.

9. A blend according to claim 1 made by polymerizing vinyl chloride containing preformed ethylene-vinylene carbonate copolymer.

References Cited in the file of this patent

UNITED STATES PATENTS

| | | |
|---|---|---|
| 2,563,771 | Adelson | Aug. 7, 1951 |

FOREIGN PATENTS

| | | |
|---|---|---|
| 985,327 | France | Mar. 7, 1951 |
| 1,037,565 | France | May 6, 1953 |

OTHER REFERENCES

Heyes, 637, O. G. 591, August 8, 1950.